INVENTOR.
EMIL UMBRICHT
BY Curtis, Morris & Safford
ATTORNEYS

United States Patent Office 3,512,762
Patented May 19, 1970

3,512,762
APPARATUS FOR LIQUID AERATION
Emil Umbricht, Northville, Mich., assignor to Ajem Laboratories, Inc., Livonia, Mich.
Filed Aug. 11, 1967, Ser. No. 660,111
Int. Cl. B01f 5/16, 7/22
U.S. Cl. 261—87                    3 Claims

ABSTRACT OF THE DISCLOSURE

An apparatus for liquid aeration having a plurality of hollow impeller blades communicating with a hollow shaft and having fluid communication passages in the hollow impeller blades whereby upon passage of said shaft and impeller blades through a liquid medium (or at least relative motion between blades and liquid) a reduced pressure is created at a surface of the impeller blades in an area where there is a communicating passage for gaseous fluid, from beyond the liquid medium, whereby it is drawn into and flows through the hollow shaft and the hollow impeller blades and becomes entrained and dispersed in the liquid around the impeller blades. The hollow shaft has passages adjacent the junctures of the blades with the shaft to provide fluid communication between the interior of the shaft and the hollow interior of the blades. The leading edges of the blades are off set from the path of the trailing edge of the blades to give an effective angle to the blades with respect to a plane normal to the axis of the shaft. The shaft has an inlet remote from the juncture of the blades with the shaft for supplying gas to flow into and through the interior portion of the shaft. A motor rotates the shaft and blades in the direction of the leading edge. An encircling skirt is fixed to the peripheral edges of the blades to amplify the displacement of a portion fo the liquid. A bottom surface of the blades extends radially outward a greater distance than a top surface of the blades. The leading edge of the top surface of the blades is longer than the trailing edge of the top surface. The peripheral edge of the top surface of the blades is spaced from the bottom surface. The fluid communication between the hollow interior and the exterior of the blades is provided by the space between the top surface and the bottom surface. The gas inlet to the shaft is provided by openings in a cover plate for the shaft and by passages in the hollow shaft. The follow shaft extends through the cover plate.

———

The present invention relates generally to a liquid aerator, and more particularly to an aerator that disperses a gas into a liquid, well below the surface of the liquid, by creating dynamic reduction of pressure below the surface of the liquid thereby sucking air, or any other gaseous fluid, through the aerator and discharging it into the liquid so to become entrained in the liquid, and advantageously subjecting it to some churning to provide dispersion and solution and driving it down into parts of the liquid more remote from the surface.

The significance and importance of dissolved air and particularly oxygen in water is well recognized. The dissolved oxygen has much to do with the balance in marine life as well as in vegetation growths that are partially or totally immersed in a body of water. The presence of oxygen also may determine the ability of certain organic residues and suspensions in the water to be degraded and/or form nutrients for the soil or tolerable by-products. Many bodies of water, such as rivers, lakes or small ponds become polluted to the extent that bacteria grows therein under essentially anaerobic conditions and may reach a very high bacteria count. Sometimes these bacteria are responsible for various organic changes and production of suspended residues that become highly objectionable, often with putrid odors.

Much of the putrid odor in such bodies of water is the result of a lack of sufficient oxygen in the water to meet the requirements for sanitary decomposition and oxidation reactions with organic materials. Lack of proper oxygen can limit the decomposition rate and also cause objectionable by-products to be formed in place of acceptable products that would result if sufficient oxygen were present. As a result, objectionable odors and health hazards due to water pollution may occur.

In cases where high amount of organic residues are ejected into streams, lakes, rivers and/or ponds, the water may become so overloaded with organic materials that the system is starved for oxygen. An adquate supply of oxygen must be provided if these various materials are to be properly chamically digested and, if additional oxygen is not added in some manner, very long periods of exposure would be required to accumulate enough oxygen in the water to support the decomposition and degradation to an inert state with release of carbon dioxide, nitrogen and other inert by-products.

The amount of oxygen present in the water also regulates the multiplication and functioning of bacteria which can cause such chemical changes of organic matter.

Prior art methods of increasing the supply of oxygen in the water have included spraying the water into the air in "fountains" or small geysers to expose a considerable quantity of the water to the oxygen in the air. Oxygen is thus dissolved in the water in a ratio corresponding to the atmospheric pressures and ambient temperatures in which the water is sprayed.

A disadvantage of this method is that large quantities of water are evaporated. Hence, the loss of water by evaporation becomes a serious factor whene eliminating objectionable bacteria, organic material and odors.

Another method by which the supply of dissolved oxygen is increased is to place nozzles for air jets under the liquid level and pump air or oxygen into the water. Normally this air is injected into the water at a relatively shallow depth and this results in the oxygen dissolving primarily in the upper layer of the water. Inversion may cause mixing of the surface water that is loaded with oxygen and the water at a lower level with low amounts of oxygen, but that takes place slowly unless there is some forced movement of the water. In this, compressed air is expensive considering the relatively small amount of air actually absorbed into the water and the relatively large amount of water which must be exposed to the additional oxygen.

Another method that has been used, in some cases, is to confine a relatively small body of liquid and put this confined body of liquid under a higher than atmospheric pressure. Due to this change in gaseous pressure a greater amount of the gas may be dissolved in the liquid. A drawback of this method is that the amount of air dissolved at a higher pressure may exceed the amount that the water will be able to hold at normal atmospheric pressure, and the excess gas may escape as bubblets. Also, this method requires the use of expensive equipment for pressurization and can be used only with a limited volume of liquid.

Another method for accelerating the rate at which oxygen is dissolved in water is accomplished by the use of a paddle system in which the water is continuously stirred at the surface of exposure with the result that dissolved oxygen from the air above is carried down into the water, and oxygen starved water from below the surface is brought to the surface to in turn be exposed to the oxygen in the air. The paddles may be on shafts rotating in a manner to encourage turbulence and bring new volumes of water to the surface, while water with dissolved oxygen is moved downward.

Still another way in which oxygen has been introduced into a body of water is through reagents that can release combined oxygen into the water, but this is expensive.

The general purpose of this invention is to provide an aerating apparatus which gives advantages of aeration previously recognized in the prior art but avoids at least some of the disadvantages. To attain this, the present invention contemplates a unique arrangement of hollow radially extending impeller blades connected to and in communication with a hollow shaft. Upon rotation of the shaft with the impeller blades below the liquid surface a column of liquid is forced downward into the body of liquid. The hollow impeller blades communicate with the hollow interior of the shaft and are provided with an appropriate exit passage for passage of gas from them into the liquid through which the rotating impellers pass, thus assuring dispersion of the gas into the liquid. The invention thus provides a liquid aerating device which can disperse a large volume of air or other gaseous fluid in a liquid.

A further object of the invention is the provision of an apparatus for aeration of liquid with minimized evaporation of the liquid.

Still another object is to provide an apparatus for effectively causing and controlling reaction of a selected gas with a liquid medium.

In accordance with the preferred embodiment of the invention, a hollow shaft is extended below the level of a liquid. The submerged end advantageously is closed, and hollow impeller blades are fixed to the shaft, with their hollow interiors communicating with the hollow interior of the shaft. These blades are advantageously near the submerged end of the hollow shaft. The blades have top and bottom divergent surfaces. The top surface is shorter than the bottom surface and has an angularly disposed peripheral edge that tapers from a wider leading edge to a narrower trailing edge. The peripheral and trailing edges of the blade are open to provide for exit of gas from the hollow interior of the shaft through the hollow impeller blades into the liquid. Thus, upon rotation of the submerged impeller, the blades impel a column of liquid, and disperse the gas into it. The liquid flowing over the blades creates suction by their airfoil action (i.e., by the Bernoulli effect) drawing air or other gaseous fluid into and through the shaft from above the surface of the liquid and discharging it into the liquid through the hollow impeller blades. A peripheral skirt is attached to the end of the blades to increase the depth penetration of the liquid. Thus, the gas is dispersed and dissolved in the liquid medium.

The various objects, aspects and advantages of the present invention will be more fully understood from a consideration of the following specification in conjunction with the accompanying drawings in which.

Figure 1:
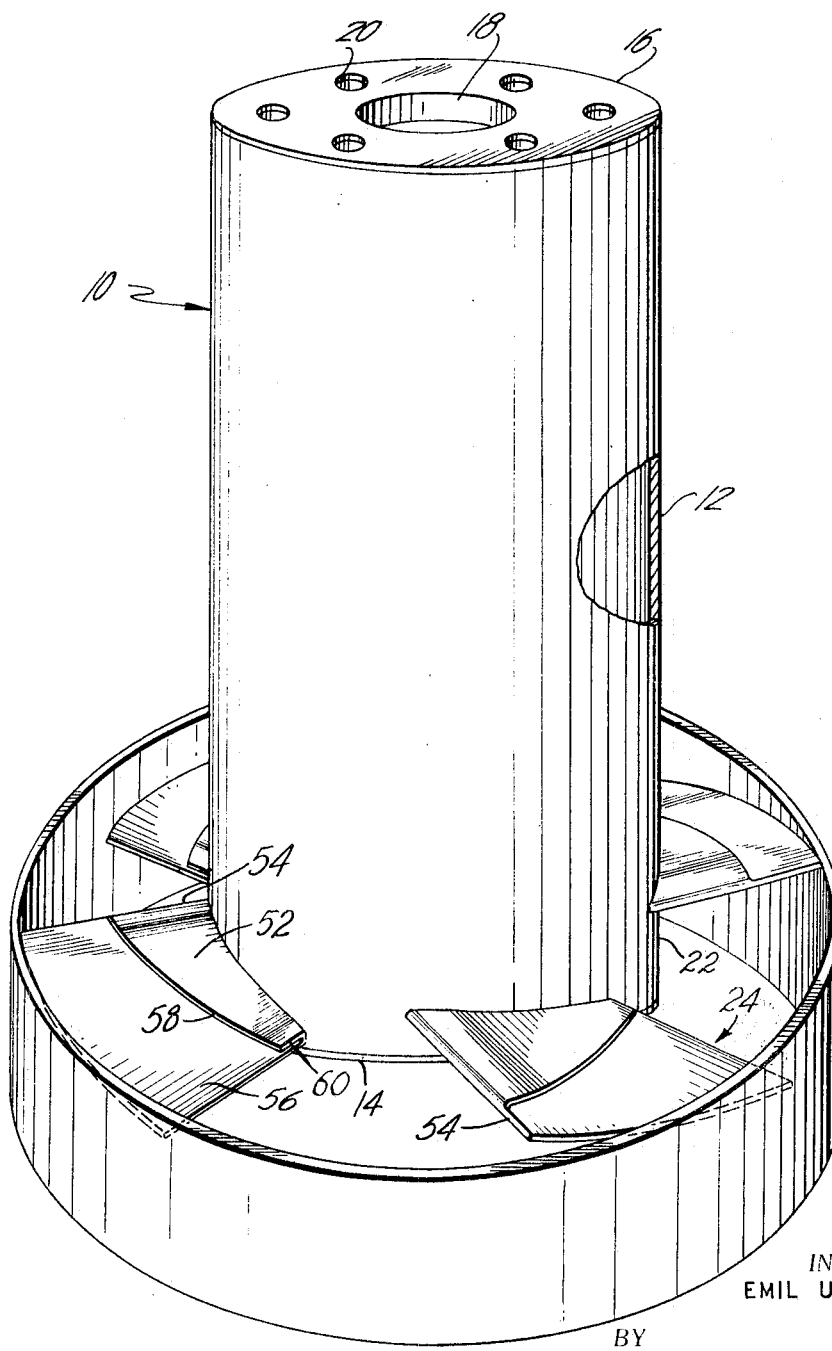
FIG. 1 is a perspective view, partly in section, showing the hollow tube impeller blades and skirt.

Referring now to the drawing, and specifically to FIG. 1, there is shown an impeller assembly 10 including a hollow cylindrical tube or shaft 12 closed at its lower end 14 and a top plate 16 with a central shaft opening 18 with air inlet holes 20 radially spaced from the shaft opening 18. Affixed to an exterior surface 22 near the lower end are hollow impeller blades 24. These blades extend radially outward from the tube 12 and are welded to the periphery of the tube at an effective pitch angle, advantageously between 5° and 45° from a plane normal to the axis of the tube.

Figure 2:
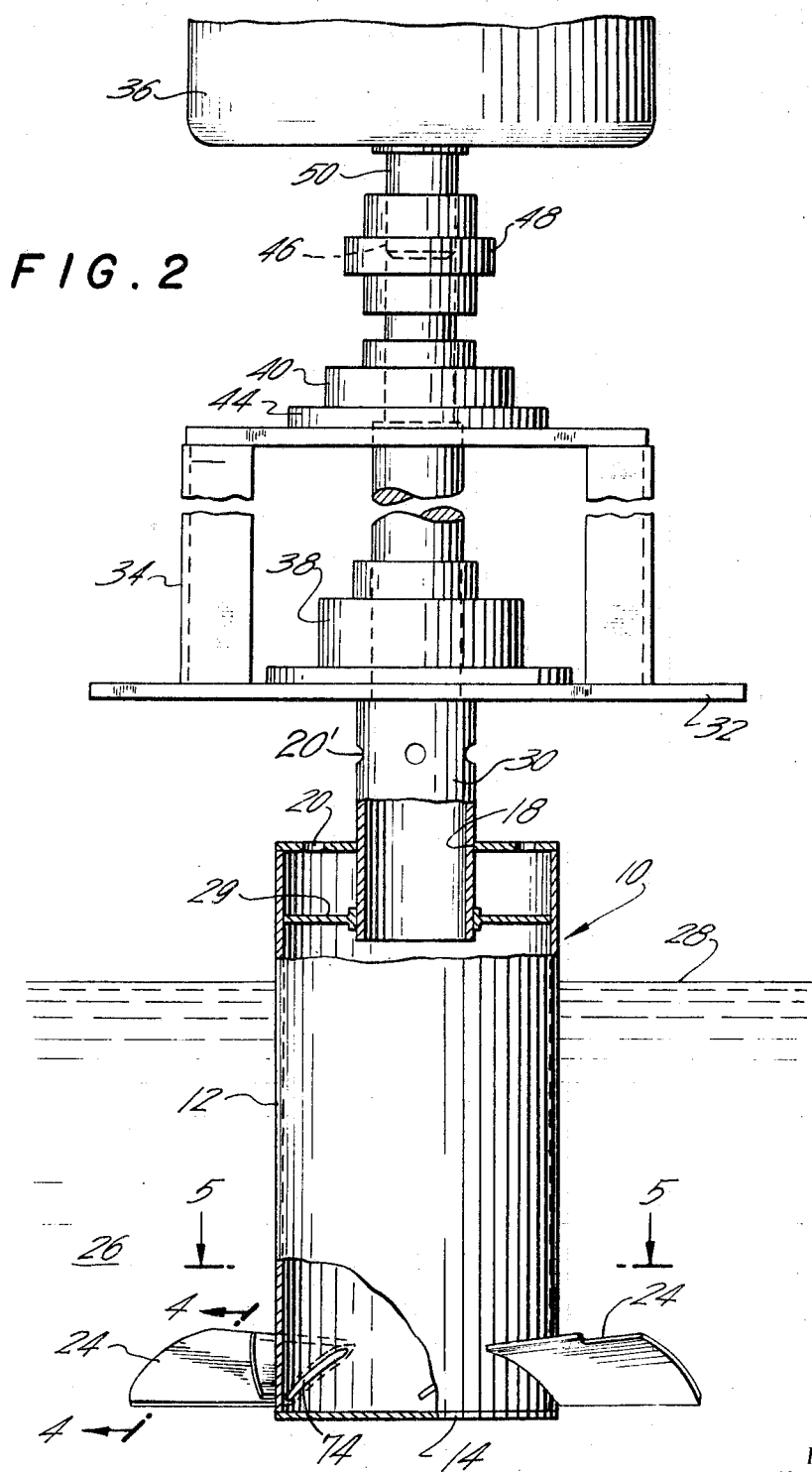
FIG. 2 is a side view partly in section and partly in elevation showing the preferred embodiment with its skirt removed of the present invention including the means for rotating the impeller.

Referring now to FIG. 2, there is shown one embodiment of the persent invention disposed in a liquid medium 26 so that the lower portion of the tube 12 and the impeller blades 24 are below the surface level 28 of the liquid. The tube and impeller assembly 10 are supported in the liquid medium 26 so that the impeller blades 24 are well below the surface of the liquid and the air inlet hoses 20 are sufficiently above the surface of the liquid to avoid entry of liquid into the hollow tube. The tube and impeller assembly 10 are rigidly fixed to rotatable shaft 30 by means of a spider and collar 29; and shaft 30 is, in turn, carried by support platform 32. The shaft 30 is hollow and may optionally include air inlet holes 20 to supplement the air inlet holes 20 in the top plate 16.

The support platform 32 is supported above the surface level of the liquid 28, for example, by a raft or piles or by bracket mountings to the side of a tank. A housing 34 is carried by the support platform 32, which along with the support platform provides support for rotatable shaft 30 and a motor 36. The shaft 30 is journaled in ball bearings 38 and 40, respectively, which are supported by bearing support plates 42 and 44, respectively. At an end 46 of the shaft 30 a suitable coupling 48 is provided to connect the rotatable shaft 30 with the motor shaft 50.

Figure 3:
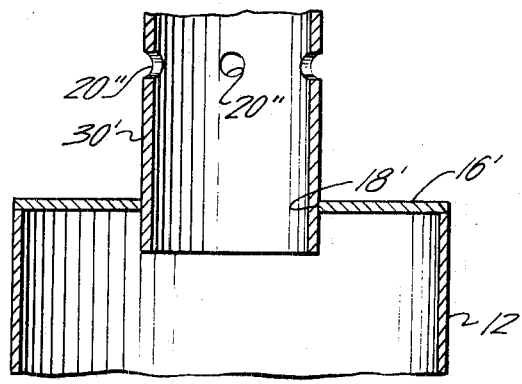
FIG. 3 is a vertical axial section view of the shaft connection with the tube showing another embodiment.

Before proceeding with a more detailed description of the impeller blades, attention is now directed to FIG. 3, which shows another embodiment for connecting the rotatable shaft with the top end of the tube 12. In this embodiment, tube 12 has a top plate 16′ with a single shaft opening 18′ for receiving a hollow shaft 30′. Shaft 30′ includes air inlet holes 20″ in its walls. The result is that instead of air entering through the top plate 16 as in the first embodiment air enters through inlet holes 20″ in the shaft 30′, otherwise this embodiment is similar to that shown in FIG. 2.

Figures 4, 6:
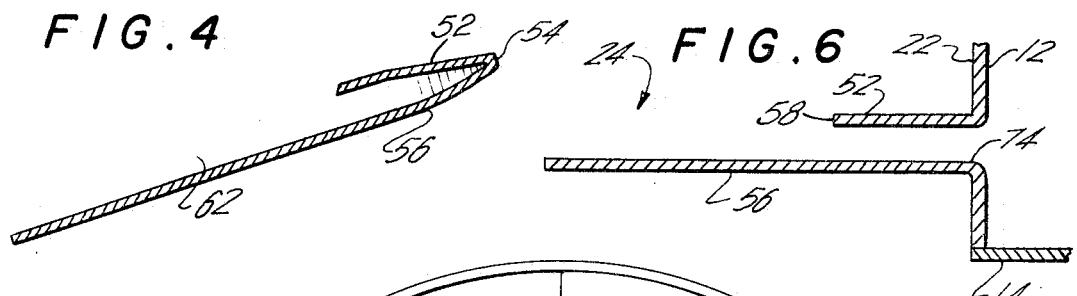
FIG. 4 is a cross-sectional view taken along line 4—4 of FIG. 5 showing a cross-section of the hollow impeller blade.
FIG. 6 is a sectional view taken along line 6—6 of FIG. 5 showing the communication passage between the hollow tube and hollow impeller blade.
Figure 5:
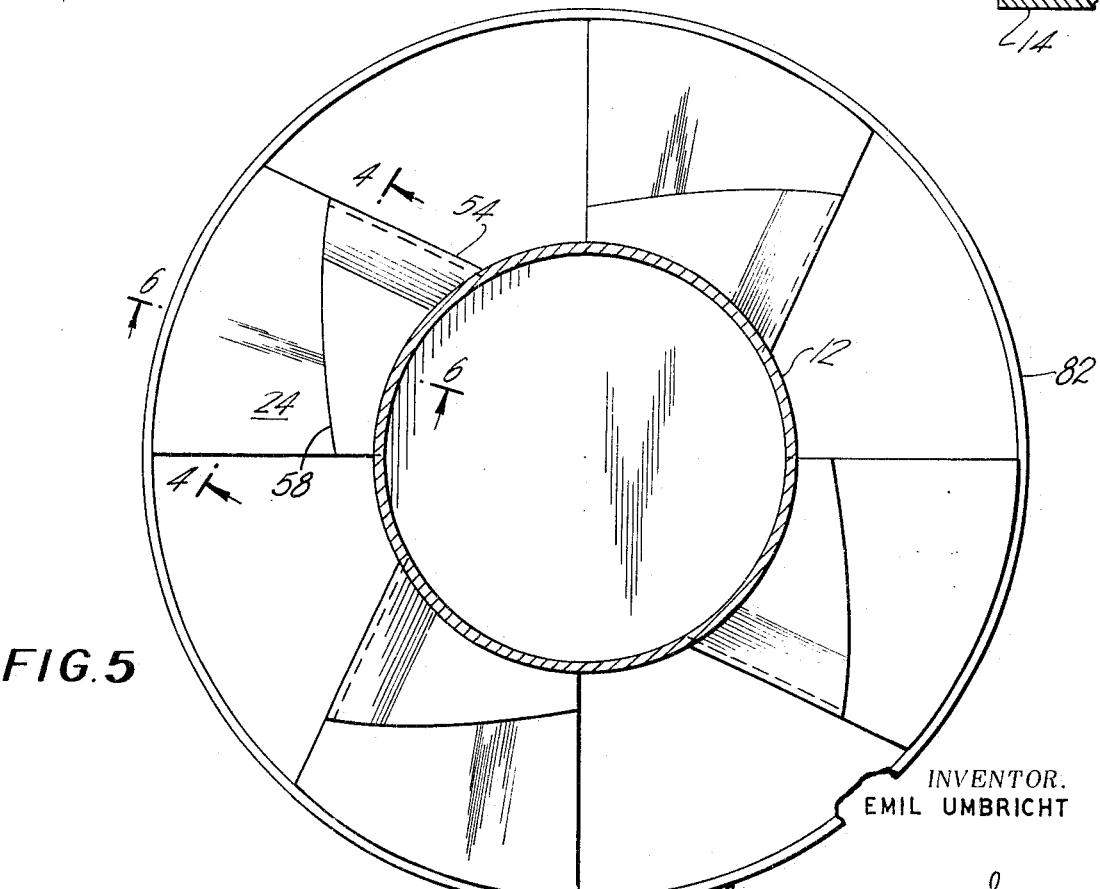
FIG. 5 is a sectional view taken along line 5—5 of FIG. 2 showing the hollow tube and radially extending impeller blades.

Referring now to FIGS. 1 and 4, there is shown the configuration of impeller blades 24. A top surface 52 is curved slightly, in the manner of an airfoil, and is joined at a leading edge 54 to a curved bottom surface 56, such that the leading edge 54 presents a rounded profile to effect acceleration of the liquid. The top and bottom surfaces of the blades provide a hollow interior 62 which communicates with the interior of the tube 12 through slots or openings 74 in its periphery. The top surface 52 is shorter than the bottom surface 56 and has an angularly disposed peripheral edge 58 that tapers from the wider leading edge 54 to a narrow trailing edge 60. A skirt 82 is attached to the peripheral edges of the bottom surface 56 of the blades and extends downwardly to a depth lower than the depth at which the blades are rotated. This skirt increases the effective depth of penetrating by concentrating the impelled column of liquid within a more confined area.

It is to be noted that since the pitch of the blades is inclined in the direction of the leading edge, e.g., from 5° to 45°, the edge of the passage in the top surface closest to the leading edge will be angularly above the edge of the passage closest to the trailing edge according to the pitch angle used. This pitch angle controls the flow of air into the liquid medium and may be correlated with the r.p.m. of the motor 36 to produce the desired flow of air into the liquid.

Further, it is to be noted that the pitch angle may be varied in each blade so that it is different at different radial distances along the blade. This will result in blades of varying curvature. Also, the width of the blade from leading edge to trailing edge may be non-uniform.

Referring now to FIG. 6, there is shown a manner in which the impeller blades 24 are affixed to the tube 12. At the juncture of tube 12 and the blade 24 the wall 22 has a slot 74 conforming to and in register with the interior of the blades 24 thus providing fluid communication between the interior of the tube 12 and the hollow interior 62 of the blade. The blade can of course be affixed in any convenient manner, for example, by welding.

In operation, the unit functions in the following manner. When motor 36 is actuated it rotates the shaft 30, the tube 12 and the impeller blades 24. Due to the pitch of the blades in the direction of rotation, a column of liquid immediately below the rotating blades is propelled downward. When the liquid column is impelled downward or outward, the column of liquid above the rotating blades must flo downward. As the rotating blades move through the liquid, the acceleration of the liquid on the backsides of the blades produces, by operation of Bernoulli's theorem, a reduction in pressure on the blades at that point similar to the partial vacuum created on the top surface of an airfoil moving through the air or a hydrofoil in water. Since, in the arangement shown, this partial vacuum is created at the top of the blade 24 along the peripheral edge 58 and the trailing edge 60, it sucks air out of the hollow interior 62 of the blade and the hollow bore of tube 12 through the fluid passage 74 into the column of liquid being impelled downward and further dispersed by action of the impeller blades. The skirt 82 confines the impelled liquid within its area, thus concentrating the impelling forces created to increase the depth of penetration of the air and liquid.

With the embodiment shown in FIG. 2, when the blades 24 rotate rapidly, fine bubblets are formed at the openings formed by the peripheral edges 58, 60 of the top surface 52 and the bottom surface 56, and these are swept into the liquid flow, and the resulting mixture of liquid and air sweeps on downward. In this manner, the initial liquid is charged with bubblets of air and driven downward and more dispersion of this air will take place with still more bubblets being formed from the frictional effects of the flowing liquid carrying these bubblets. This is a distinct achievement in that the aerated liquid is pushed downward into the substrate, which is aerated thereby and the resulting mixture of bubblet air and liquid will be more widely dispersed and more air dissolved in the liquid as it is impelled downward by the blades.

The effectiveness of the apparatus of the present invention to aerate a given body of liquid is increased, with an increase in the ability of the apparatus to propel a column of liquid to a greater depth by the provision of the peripheral skirt 82 on the peripheral edges of the bottom surface 56.

In addition, a greater number of blades may be used up to that at which excessive turbulence and drag are produced.

The apparatus of the present invention is also effective for liquid purification. If oil or other contaminants are dispersed in a body of liquid the combination of the turbulence created by the rotating impeller blades and the aeration serves to produce flotation e.g., for gathering oil or fine particulate matter and raising the combined liquid and solid residue to the surface where it can be skimmed or removed by other means.

The apparatus of the present invention also has other applications e.g., to provide for introducing other gaseous materials by themselves or in any mixture with air or other selected gases into a liquid medium for whatever purposes desired. An example of this application would be the introduction of controlled amounts of chlorine in the interior of tube 12 to be dispersed in the water in order to chlorinate the water. Another application would be the introduction of gaseous reactants with organic liquids in large scale chemical production processes. An example of this industrial use would be the application of oxygen to liquid hydrocarbons for controlled oxidation.

While the embodiment described above provide for rotating the impeller assembly in a liquid downward it is to be understood that the blades may be arranged with a negative pitch so that liquid is impelled upward. Further, it is not necessary to rotate the impellers when liquid is allowed to flow over stationary blades as the dynamic effect is sufficient to create enough partial vacuum to suck air down through the blades to become dispersed in the flowing liquid.

What is claimed is:

1. An aerator adapted to be disposed in a liquid medium comprising:
    a rotatably mounted tube;
        a plurality of impeller blades fixed to said tube at a level within the liquid medium;
    said blades having opposite walls joined at leading edges and spaced to form hollow interiors;
    said tube having passages adjacent the juncture of said blades respectively with said tube to provide fluid communication between the interior of said tube and said hollow interior of said blade;
    said blades having outlet passages communicating between the hollow interior thereof and the exterior;
    said leading edges of said blades being offset from the path of the trailing edge of said blades thereby giving an effective angle to said impeller blades with respect to a plane normal to the axis of said tube;
    said tube having an inlet remote from the juncture of said blades with said tube for supplying gas to flow into and through the interior portion of said tube;
    means for rotating said tube and said blades in the direction of the leading edge whereby, upon said rotation in the liquid medium, a portion of said liquid is displaced creating a suction on one surface of said blades to suck gaseous fluid through the tube and the blades and into said liquid medium; and
    means to amplify the displacement of said portion of liquid including an encircling skirt fixed to the peripheral edges of said impeller blades; and wherein a bottom surface of said blades respectively extends radially outward a greater distance than a top surface, said leading edge of said top surface is longer than the trailing edge of said top surface and the peripheral edge of said top surface is spaced from said bottom surface and wherein said fluid communication between said hollow interior and the exterior of said blades is provided by the space between said top surface and said bottom surface.

2. The aerator of claim 1 wherein said means to rotate said tube includes a drive shaft adapted to be coupled to a motor;
    said drive shaft having means for positive connection with said tube drive;
    said tube having a cover plate at an end remote from said impeller blades; and
    said inlet to supply gas into the interior portion of said tube being disposed in said cover plate above the liquid level.

3. The aerator of claim 1 wherein said tube includes a cover plate at an end remote from said impeller blades;
    said means to rotate said tube includes a drive shaft, adapted to be coupled to a motor and connected to said tube;
    said drive shaft being hollow and extending into said cover plate; and said shaft having gas inlet passages communicating with the exterior atmosphere and the interior of said tube.

References Cited

UNITED STATES PATENTS

| | | |
|---|---|---|
| 1,579,355 | 4/1926 | Greenawalt. |
| 2,041,184 | 5/1936 | Isenhour. |
| 2,826,401 | 3/1958 | Peters _____ 261—87 |
| 2,928,661 | 3/1960 | Mac Laren _____ 261—87 X |
| 3,206,176 | 9/1965 | Peterson _____ 210—15 X |

OTHER REFERENCES

German printed application 1,111,111, Roll; July 1961.

RONALD R. WEAVER, Primary Examiner

U.S. Cl. X.R.

209—169; 210—219, 221; 259—95